No. 686,397. Patented Nov. 12, 1901.
R. J. EDWARDS.
CURRYCOMB.
(Application filed June 7, 1901.)
(No Model.)
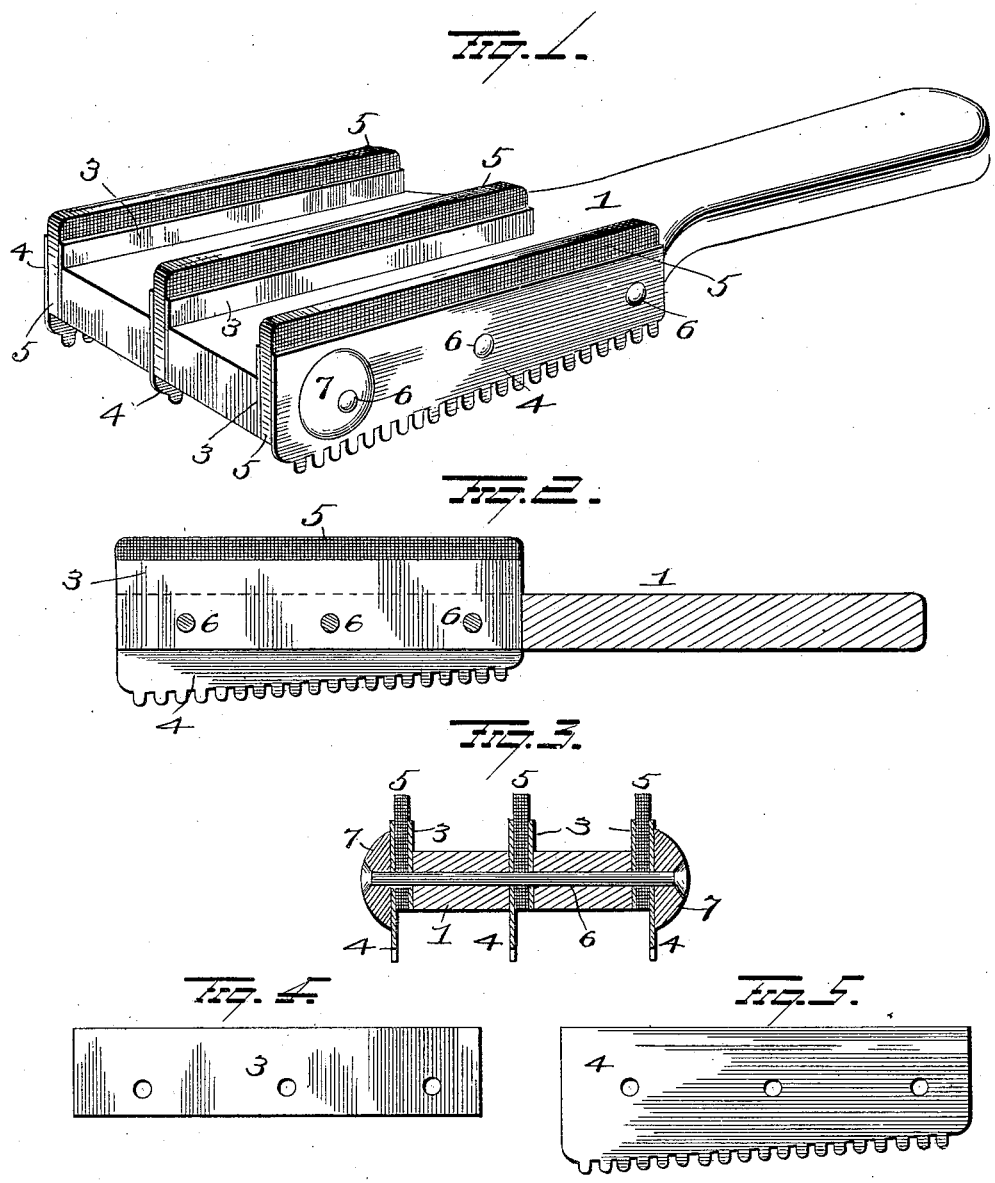

UNITED STATES PATENT OFFICE.

RICHARD J. EDWARDS, OF GALENA, ILLINOIS.

CURRYCOMB.

SPECIFICATION forming part of Letters Patent No. 686,397, dated November 12, 1901.

Application filed June 7, 1901. Serial No. 63,620. (No model.)

*To all whom it may concern:*

Be it known that I, RICHARD J. EDWARDS, a resident of Galena, in the county of Jo Daviess and State of Illinois, have invented certain new and useful Improvements in Currycombs and Scrapers; and I do hereby declare the following to be a full, clear, and exact description of the invention, such as will enable others skilled in the art to which it appertains to make and use the same.

My invention relates to an improvement in currycombs and scrapers adapted for use in the cleaning of animals, the object of the invention being to provide an improved device of this character which will greatly facilitate the cleaning of animals of tender hides and the removal of sweat and wet mud therefrom.

With this object in view the invention consists in certain novel features of construction and combinations and arrangements of parts, as will be more fully hereinafter described, and pointed out in the claims.

In the accompanying drawings, Figure 1 is a perspective view illustrating my improvements. Fig. 2 is a view in section of the same. Fig. 3 is a view in section taken at right angles to Fig. 2, and Figs. 4 and 5 are views of details.

1 represents an elongated block, preferably of wood, recessed centrally at one end to receive a metal-toothed comb 4 and a metal strip 3, having a rubber or leather scraper 5 interposed and secured between them, the comb 4, projecting beyond the block at both sides thereof, having teeth on one edge, but made smooth on its other edge. The rubber or leather scraper 5 projects beyond the smooth edge of the comb and strip 3 to form a rubbing or scraping surface braced by the comb and strip and affording a yielding support or cushion for the comb. Similar combs 4, strips 3, and scrapers 5 are located on the outer edges of the block 1, all of the toothed edges of the combs projecting from the same face of the block and the rubber scrapers projecting from the opposite face thereof, the combs sloping inward from their outer to their inner ends, as shown, while the scrapers preferably project an equal distance from the block at both ends of the scrapers, and said block is contracted or trimmed down at one end to form a handle, as shown. All of the combs 4, strips 3, and scrapers are secured to the block by transverse bolts or rods 6, passed through the combs, strips, scrapers, and block and upset at their respective ends, suitable metal buttons or knockers 7 being secured on the sides of the device by one of the bolts or rods 6 to protect the device when given a sharp blow to clean the combs and scrapers.

With my improvements above described the toothed combs will perform every function of a currycomb, while the rubber or leather scrapers are adapted for cleaning animals of tender hides or the tender parts of animals without pain or injury to the animal. The scrapers are also especially adapted for scraping mud or sweat from the animal or for cleaning robes, blankets, &c., and as the smooth edges of the combs and strips 3 project beyond the block they will brace and support the scrapers, thereby preventing them from being broken or distorted by use. The scrapers likewise serve as cushions for the combs and make them slightly yielding, thereby lengthening the life of the device and making it more comfortable to the animal being cleaned.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a currycomb and scraper, the combination with a block or plate, of a comb projecting from one face of the block or plate, a flexible scraper secured beside the comb and projecting beyond the other face of the block or plate and transverse fastening devices passing through the comb, scraper and block or plate.

2. In a currycomb and scraper, the combination with a block or plate, of a series of combs projecting from one face of the block or plate and a series of flexible scrapers secured alongside the combs and projecting beyond the other face of the block or plate and a series of bolts passing transversely through the block or plate, the combs, the flexible strips and the scrapers.

3. In a currycomb and scraper, the combination with a block or plate, of a metal comb secured to and projecting beyond both sides or faces of the block or plate, teeth on one edge of the comb and a rubber or leather strip or scraper secured beside the comb and having its edge projecting beyond the smooth edge of the comb.

4. In a currycomb and scraper, the combination with a block recessed at one end, of a comb toothed on one edge, and a metal strip secured in said recess, and a rubber or leather strip secured between said comb and metal strip and projecting beyond the smooth edge of the comb.

5. The combination with a block, of a metal strip projecting beyond one face of the block, a flexible strip disposed against said metal strip and projecting beyond the projecting edge thereof, a comb disposed against the flexible strip and projecting beyond the other face of the block and fastening devices passing through the comb, flexible strip and metal strip and entering the block.

In testimony whereof I have signed this specification in the presence of two subscribing witnesses.

RICHARD J. EDWARDS.

Witnesses:
PAUL KERZ,
WILLIE D. KELLY.